United States Patent [19]
McMahon

[11] Patent Number: 5,166,220
[45] Date of Patent: Nov. 24, 1992

[54] WATER SOFTENING PROCESS

[76] Inventor: John M. McMahon, 11946 Heritage Cir., Downey, Calif. 90241

[21] Appl. No.: 891,196

[22] Filed: Jun. 1, 1992

[51] Int. Cl.[5] ............................... C02F 1/42
[52] U.S. Cl. ................................ 521/26; 210/670; 210/792; 210/785
[58] Field of Search ............ 521/26; 210/670, 274, 210/275, 190, 792, 785

[56] References Cited

U.S. PATENT DOCUMENTS

| | | | |
|---|---|---|---|
| 3,398,090 | 8/1968 | Bartell et al. | 210/670 |
| 4,659,460 | 4/1987 | Muller et al. | 210/93 |
| 4,804,465 | 2/1989 | Brown | 210/284 |

Primary Examiner—Stanley S. Silverman
Assistant Examiner—Cynthia L. Nessler
Attorney, Agent, or Firm—Edgar W. Averill, Jr.

[57] ABSTRACT

An improved process for regenerating the ion exchange resin in a water softening system. The process substantially reduces the amount of water and salt required for regeneration of the resin. The process includes the steps of venting the resin tank to the atmosphere and draining eventually all of the water from around the resin. Next, a brine solution is added to the resin tank. This is allowed to remain in contact with the resin until the resin is regenerated, preferably aided by energizing a vibrator positioned on the exterior of the tank. Next, the brine solution is drained from the resin tank which is then filled with water to rinse the brine from the resin. After rinsing, the resin is ready for use.

3 Claims, 1 Drawing Sheet

WATER SOFTENING PROCESS

BACKGROUND OF THE INVENTION

The field of the invention is water softening, and the invention relates more particularly to the in situ regeneration of ion exchange resin with a brine solution.

In the typical home water softening system, regeneration is carried out periodically by circulating a dilute brine solution through the ion exchange resin, after which water is passed through the resin to purge the brine from the resin. A typical water softening cycle utilizes 85 gallons of water and 15 pounds of salt.

The basic water softening process has been known for many years when zeolite was used for this purpose. Later, ion exchange resins were found to be more efficient. The water softening process is discussed in U.S. Pat. Nos. 1,450,985, 3,154,484 and 4,314,905. All of these processes, however, use more water and salt than is necessary.

SUMMARY OF THE INVENTION

It is an object of the present invention to provide a regeneration process for ion exchange resin which uses a minimum of water and salt.

The present invention is for an improved process for regeneration ion exchange resin. The process involves the steps of venting the resin-containing tank to the atmosphere and pumping essentially all of the water from around the resin. Next, a concentrated brine solution is pumped into the resin tank and allowed to remain in contact therewith for a time sufficient to regenerate the resin. Next, the brine solution is pumped from the resin tank, and rinse water is introduced into the tank until the brine is rinsed from the resin. Instead of using 85 gallons of water and 15 pounds of salt, the improved process uses only 15 gallons of water and 5 pounds of salt. Advantageously, the resin tank is equipped with an external vibrator which is energized when the brine solution is in contact with the resin.

DESCRIPTION OF THE PREFERRED EMBODIMENTS

Figure 1:
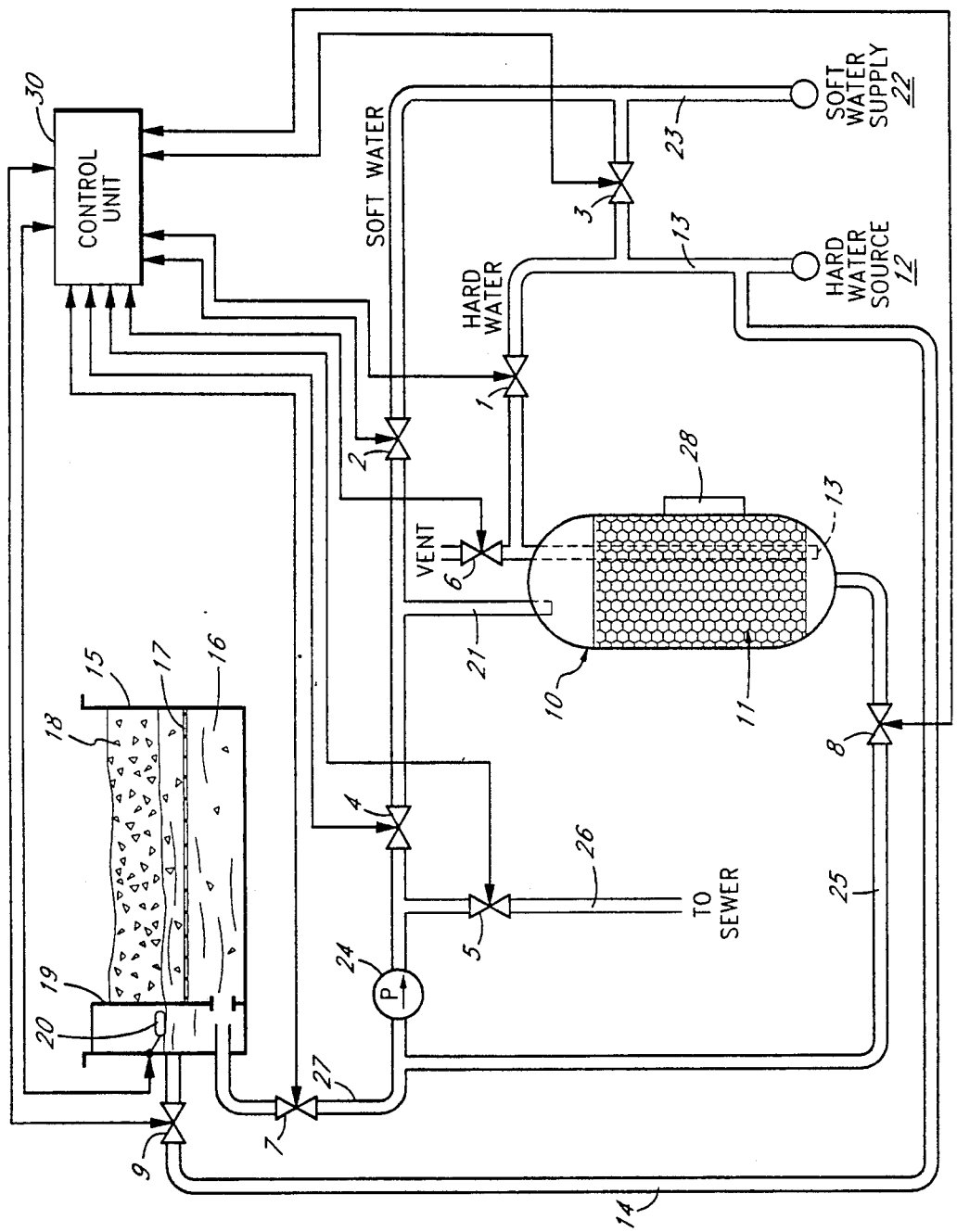
FIG. 1 is a schematic diagram illustrating the process of the present invention.

A resin tank 10 contains a bed 11 of ion exchange resin of a conventional nature. A source of hard water 12 conveys water through a pipe 13 through the top of tank 10 to the bottom of resin bed 11 through valve 1. A vent valve 6 is capable of introducing atmospheric air into tank 10 to drain the same.

A pipe 14 conveys hard water to a brine tank 15 which contains a brine solution which is essentially saturated with sodium chloride. A screen 17 prevents salt pellets 18 from completely filling the area below screen 17. A level compartment 19 contains a float valve assembly 20 which controls the inlet of hard water through valve 9 to keep the brine level constant.

In the normal service configuration, hard water enters at 12, passes through pipe 13, valve 1 and into the bottom of resin tank 10. It then passes upwardly through bed 11 of ion exchange resin and exits at the top through pipe 21 through valve 2 and pipe 23 to soft water supply 22. In this configuration, valves 3, 4, 5, 6, 7 and 8 are closed.

In the regeneration process, valve 3 is opened to provide hard water at the soft water supply. During the regeneration cycle, valves 1 and 2 are closed. Valves 5, 8 and 6 are opened, and pump 24 is energized to drain the water through lines 25 and 26 to the sewer. This allows air to enter the top of resin tank 10 through vent valve 6 and essentially completely drains the water from around the bed 11 of ion exchange resin. Once the bed is drained, valves 5 and 8 are closed, and valves 7 and 4 are opened, and pump 24 is energized to add about two gallons of brine solution 16 through line 27 to the resin tank 10 after which valve 7 is closed. The brine solution is then allowed to remain in contact with bed 11 of ion exchange resin for a time sufficient to regenerate the resin (typically about five minutes). Preferably, a vibrator 28 is energized to further increase the contact of the brine solution with the resin particles. The brine solution is then pumped out by opening valves 5 and 8 and energizing pump 24. After the regeneration process is complete, valves 1, 4 and 5 are opened, vent valve 6 is closed as is valve 8, and the small amount of remaining brine solution is rinsed out through pipes 21 and 26 to the sewer. Sufficient water is run through the bed and out through line 21, valves 4 and 5, and line 26 to the sewer until the residual salt is purged from the resin (typically about ten gallons). At this point, valves 4 and 5 are closed as is valve 3. Valve 2 is opened to once again convey soft water through pipe 21, valve 2 and pipe 23 to the soft water supply 22.

The process of the present invention reduces water usage from 85 gallons to 15 gallons and salt usage from 15 pounds to 5 pounds. This results in a substantial water savings and also a reduction of pollution by brine. The water softening cycle is carried out at a time of minimum water usage such as the middle of the night for residential purposes since hard water is supplied to the system during the softening step.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. An improved process for regenerating in situ the ion exchange resin in a water softening system of the type where water is passed through a bed of ion exchange resin in a resin tank, which resin exchanges sodium ions for calcium and magnesium ions and which is regenerated in situ by periodically contacting the ion exchange resin with a brine solution, wherein the improvement comprises:

venting the resin tank to the atmosphere by opening a vent valve;
essentially completely draining the water from the resin tank;
adding a brine solution to the resin tank;
waiting for a time sufficient to regenerate the resin;
essentially completely draining the brine solution from the resin tank and wasting it to the drain;
filling the resin tank with purge water;
closing the vent valve; and
purging the regenerated resin by passing water therethrough thereby completing the regeneration process with a minimum of water and brine usage.

2. The process of claim 1 wherein said brine solution is an essentially saturated solution of sodium chloride.

3. The process of claim 1 wherein a vibrator is affixed to the exterior of said resin tank and energized while the brine solution is in contact with the ion exchange resin.

* * * * *